United States Patent
Yoon (10) Patent No.: US 12,496,968 B2
(45) Date of Patent: Dec. 16, 2025

(54) DEVICE AND METHOD FOR VEHICLE COLLISION CAUTIONARY INFORMATION USING ROAD REFLECTOR

(71) Applicant: HL Klemove Corp., Incheon (KR)

(72) Inventor: Taesik Yoon, Siheung-si (KR)

(73) Assignee: HL KLEMOVE CORP., Incheon (KR)

(*) Notice: Subject to any disclaimer, the term of this patent is extended or adjusted under 35 U.S.C. 154(b) by 125 days.

(21) Appl. No.: 18/379,795

(22) Filed: Oct. 13, 2023

(65) Prior Publication Data

US 2024/0383402 A1 Nov. 21, 2024

(30) Foreign Application Priority Data

May 17, 2023 (KR) ........................ 10-2023-0063787

(51) Int. Cl.
*B60Q 9/00* (2006.01)

(52) U.S. Cl.
CPC .................................. *B60Q 9/008* (2013.01)

(58) Field of Classification Search
None
See application file for complete search history.

(56) References Cited

U.S. PATENT DOCUMENTS

| | | | | |
|---|---|---|---|---|
| 7,378,947 B2* | 5/2008 | Daura Luna | ........... | B60Q 9/008 180/169 |
| 12,036,923 B2* | 7/2024 | Ishizaki | ........... | B60Q 9/008 |
| 2008/0036579 A1* | 2/2008 | Boss | ........... | G08G 1/162 701/301 |
| 2014/0081542 A1* | 3/2014 | Yao | ........... | B60W 10/06 701/124 |
| 2014/0176716 A1* | 6/2014 | Wallat | ........... | B60W 30/12 348/148 |
| 2015/0054659 A1* | 2/2015 | Chen | ........... | G08G 1/096783 340/905 |
| 2016/0046229 A1* | 2/2016 | Armenta Lopez | ........... | B60Q 1/00 340/441 |
| 2017/0001565 A1* | 1/2017 | Nakano | ........... | G06V 20/586 |
| 2018/0181824 A1* | 6/2018 | Ishii | ........... | G06V 20/58 |
| 2019/0197324 A1* | 6/2019 | Ji | ........... | G06V 20/58 |
| 2020/0148226 A1* | 5/2020 | Kim | ........... | B60W 50/0097 |
| 2022/0242485 A1* | 8/2022 | Kim | ........... | B60Q 9/008 |
| 2022/0297697 A1* | 9/2022 | Bhat | ........... | B60W 10/20 |

FOREIGN PATENT DOCUMENTS

KR 20000019327 A * 4/2000 ......... G06K 9/00798

* cited by examiner

*Primary Examiner* — Muhammad Adnan
(74) *Attorney, Agent, or Firm* — Hauptman Ham, LLP (57) ABSTRACT

The present disclosure relates to a device for vehicle collision cautionary information using a road reflector that recognizes the road reflector by a vehicle and warns a driver, including a road reflector detecting means provided in the vehicle to detect the road reflector, a controller provided in the vehicle to determine whether to generate a warning when the road reflector is detected by the road reflector detecting means; and a warning generating means provided in the vehicle to generate the warning according to the determination of the controller.

19 Claims, 6 Drawing Sheets

DEVICE AND METHOD FOR VEHICLE COLLISION CAUTIONARY INFORMATION USING ROAD REFLECTOR

CROSS-REFERENCE TO RELATED APPLICATION

This application claims the benefit of Korean Patent Application No. 10-2023-0063787 filed on May 17, 2023, in the Korean Intellectual Property Office, the entire disclosure of which is incorporated herein by reference for all purposes.

BACKGROUND

1. Field of the Invention

The present disclosure relates to a device and method for vehicle collision cautionary information, and more particularly, to a device and method for vehicle collision cautionary information using a road reflector for recognizing the road reflector by a vehicle and giving a warning to a driver.

2. Description of the Related Art

A road reflector is a road accessory regulated by law, and is a facility installed to promote smooth communication and safety of traffic and prevent traffic accidents. Road reflectors are installed in places where visibility is not sufficiently secured, such as curved sections in mountainous areas, non-signalized intersections where signal control is not performed, and underground parking lots, and the installation location, shape, size and radius of curvature of the mirror surface, installation height, etc., are regulated by law.

In general, when driving a vehicle, a driver visually checks an opponent vehicle approaching from the opposite side to drive with caution, and recently, a system for identifying and warning of the opponent vehicle with a camera or sensor provided in the vehicle has been developed and applied.

In places where the driver or detection means cannot directly check the opponent vehicle, such as a curved section in a mountainous area, an non-signalized intersection, or an underground parking lot, the opponent vehicle is identified through the road reflector. Typically, the driver checks the presence or absence of the opponent vehicle while visually checking the appearance of the opponent vehicle reflected in the road reflector.

When the driver visually checks the road reflector while driving, several issues may occur. When the own vehicle or the opponent vehicle is far away from the road reflector, there is a limit to recognizing the opponent vehicle through the road reflector, and there is a limit to recognizing the opponent vehicle through the road reflector even depending on weather conditions such as snow or rain.

In order to solve such issues, technologies for displaying a separate warning signal on the road reflector to alert the driver that an opponent vehicle is approaching are known. For example, a technology for detecting an approaching vehicle with a road reflector using ultrasonic waves and generating a light when the vehicle is detected to issue a warning to the approaching vehicle is known. In addition, a technology for allowing a driver to recognize whether an opponent vehicle is approaching by detecting a distance of the approaching vehicle through a road reflector and displaying the distance is also known.

However, as described above, technologies for issuing a warning to a driver by providing a warning means in a road reflector also have limitations in recognition depending on distance or weather conditions because the driver must visually check. In addition, the driver needs to pay attention to the road reflector, but if the driver's attention is insufficient, the warning signal of the road reflector may not be recognized.

SUMMARY

The present disclosure has been made to solve the issues of the related art as described above, and an object of the present disclosure is to provide a device and method for vehicle collision cautionary information using a road reflector capable of preventing a risk of collision with an opponent vehicle in a section where the road reflector is installed by detecting the road reflector by a vehicle while driving on the road and issuing a warning signal to a driver.

In addition, an object of the present disclosure is to provide a device and method for vehicle collision cautionary information using a road reflector that allows the driver to easily check whether the opponent vehicle is approaching, by being configured to recognize the opponent vehicle reflected through the road reflector by the vehicle and issue a warning signal to the driver by the vehicle.

In accordance with a preferred example embodiment of the present disclosure for achieving the above objects, there is provided a device for vehicle collision cautionary information using a road reflector including: a road reflector detecting means provided in a vehicle to detect a road reflector; a controller provided in the vehicle to determine whether to generate a warning when the road reflector is detected by the road reflector detecting means; and a warning generating means provided in the vehicle to generate the warning according to the determination of the controller.

The controller is configured to determine whether to generate a warning by determining whether object information transmitted from the road reflector detecting means satisfies a road reflector installation standard.

The device for vehicle collision cautionary information using the road reflector according to example embodiments further includes an opponent vehicle detecting means provided in the vehicle to detect a reflected appearance when an opponent vehicle in an opposite lane is reflected through the road reflector and transmit detection information to the controller, wherein the controller is configured to determine whether to generate the warning after determining both road reflector detection requirements and opponent vehicle detection requirements through the road reflector.

The road reflector detecting means is a front camera installed in the front of the vehicle.

The road reflector detecting means and the opponent vehicle detecting means are front cameras installed in the front of the vehicle.

The device for vehicle collision cautionary information using the road reflector according to example embodiments further includes a vehicle speed detecting means provided in the vehicle to detect a speed of the own vehicle, wherein the controller is configured to further determine the speed of the own vehicle detected by the vehicle speed detecting means as a warning generating requirement.

The device for vehicle collision cautionary information using the road reflector according to example embodiments further includes a steering angle detecting means provided in the vehicle to detect a steering angle of the own vehicle, wherein the controller is configured to calculate a curvature of a road through the steering angle of the own vehicle detected by the steering angle detecting means and further determine the curvature of the road as a warning generating requirement.

The device for vehicle collision cautionary information using the road reflector according to example embodiments further includes a distance detecting means provided in the vehicle to detect a distance between the own vehicle and the road reflector, wherein the controller is configured to further determine the distance between the own vehicle and the road reflector detected by the distance detecting means as a warning generating requirement.

The device for vehicle collision cautionary information using the road reflector according to example embodiments further includes an own vehicle location checking means provided in the vehicle to check a driving location of the own vehicle, wherein the controller is configured to further determine the driving location of the own vehicle checked through the own vehicle location checking means as a warning generating requirement.

The own vehicle location checking means is a GPS transceiver provided in the vehicle to perform transmission and reception with GPS satellites.

The device for vehicle collision cautionary information using the road reflector according to example embodiments further includes an exit alarm detecting means provided in the vehicle to detect an exit cautionary alarm of a parking lot, wherein the controller is configured to further determine an exit alarm confirmed through the exit alarm detecting means as a warning generating requirement.

According to another aspect of the present disclosure, there is provided a method for vehicle collision cautionary information using a road reflector, including: (a) detecting a road reflector by an own vehicle; (b) determining whether to generate a warning by a controller when the road reflector is detected; and (c) generating the warning to the own vehicle according to the determination of the controller.

Operation (b) includes determining whether to generate the warning by comparing an installation standard of the road reflector previously input to the controller with installation information of a detected object and determining whether the detected object satisfies the installation standard of the road reflector.

The method for vehicle collision cautionary information using the road reflector according to example embodiments further includes (d) detecting a reflected appearance when an opponent vehicle in an opposite lane is reflected through the road reflector and transmitting detection information to the controller, wherein operation (b) includes determining whether to generate the warning by considering both whether the road reflector is detected and whether the appearance of the opponent vehicle is confirmed through the road reflector.

Operation (b) includes determining whether to generate the warning by further determining whether the reflected appearance of the opponent vehicle through the road reflector is a front part or a rear part.

The method for vehicle collision cautionary information using the road reflector according to example embodiments further includes (e) detecting a speed of the own vehicle, wherein operation (b) includes determining whether to generate the warning by further determining whether the speed of the own vehicle meets a standard speed.

The method for vehicle collision cautionary information using the road reflector according to example embodiments further includes (f) detecting a steering angle of the own vehicle, wherein operation (b) includes determining whether to generate the warning by determining a curvature of a road being driven through the steering angle of the own vehicle and further determining whether the road curvature meets a standard.

The method for vehicle collision cautionary information using the road reflector according to example embodiments further includes (g) detecting a distance between the own vehicle and the road reflector, wherein operation (b) includes determining whether to generate the warning by further determining whether the distance between the own vehicle and the road reflector meets a standard.

The method for vehicle collision cautionary information using the road reflector of according to example embodiments further includes (h) checking a location of the own vehicle, wherein operation (b) includes determining whether to generate the warning by further determining the location of the own vehicle.

The method for vehicle collision cautionary information using the road reflector according to example embodiments further includes (i) detecting an exit alarm when entering and exiting a parking lot, wherein operation (b) includes determining whether to generate the warning by further determining whether the exit alarm is detected.

According to a device and method for vehicle collision cautionary information using a road reflector of the present disclosure, by recognizing the road reflector by a vehicle and issuing a warning signal to a driver by the vehicle, it is possible to prevent the risk of collision in advance by allowing the driver to drive with caution when driving on a curved section where the road reflector is installed.

Further, in addition to whether the road reflector is recognized, by additionally considering various factors such as checking the presence or absence of an opponent vehicle in the opposite lane through the road reflector, whether the opponent vehicle is approaching through the road reflector, the speed of the own vehicle, the curvature of the road being driven, the distance between the own vehicle and the road reflector, the location of the own vehicle and whether an exit alarm is generated in the parking lot, it is possible to control whether to generate a warning precisely and efficiently. In other words, by additionally considering the above factors, unnecessary warning generation may be reduced, and intensity and frequency of warning generation may be controlled in proportion to the risk of a collision.

DETAILED DESCRIPTION

Hereinafter, a device and a method for vehicle collision cautionary information using a road reflector according to a preferred example embodiment the present disclosure will be described in detail with reference to the accompanying drawings.

Figure 1:
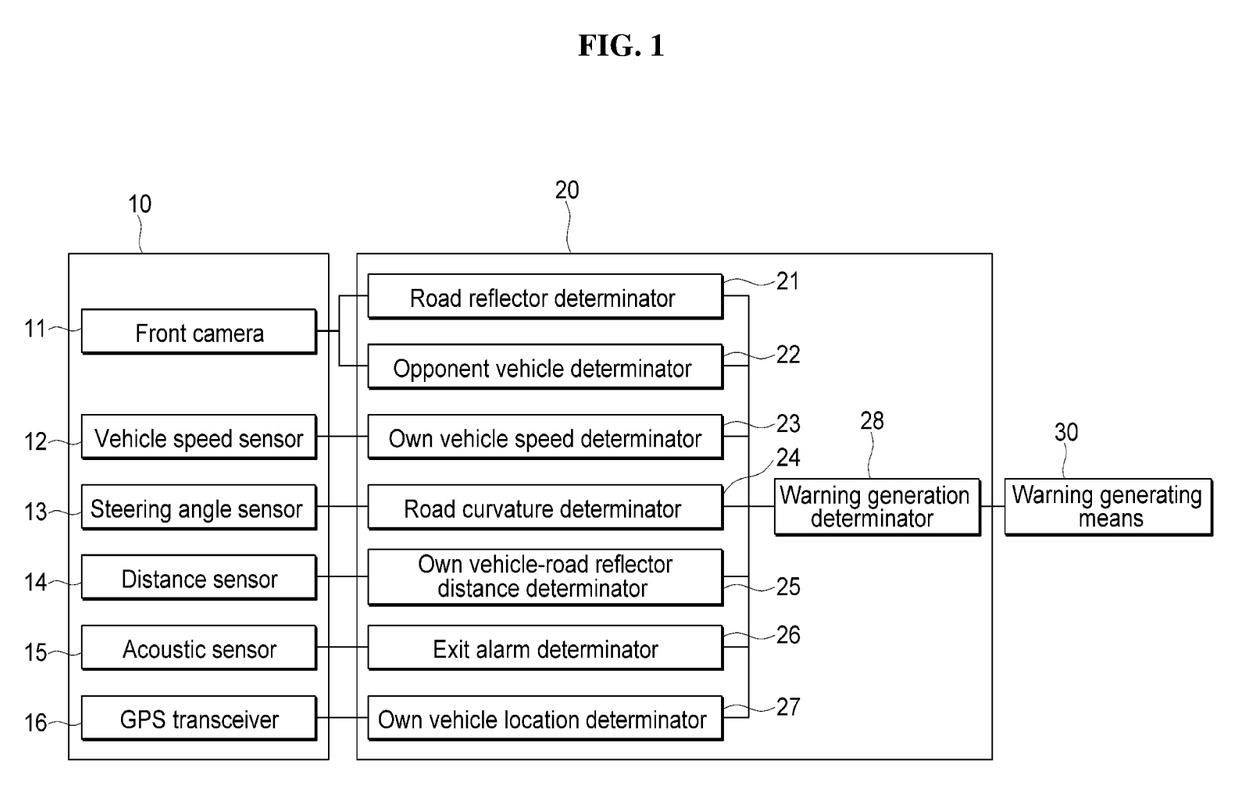
FIG. 1 is a diagram illustrating a configuration of a device for vehicle collision cautionary information using a road reflector according to a preferred example embodiment of the present disclosure.

FIG. 1 of the accompanying drawings is a diagram illustrating a configuration of a device for vehicle collision cautionary information using a road reflector according to a preferred example embodiment of the present disclosure.

A device for vehicle collision cautionary information using a road reflector according to a preferred example embodiment of the present disclosure includes a detecting means 10 configured to detect external objects and voice signals and detect a driving state of a vehicle (hereinafter referred to as "own vehicle"), a controller 20 configured to analyze information transmitted from the detecting means 10 to determine whether to generate a warning, and a warning generating means 30 configured to generate a warning according to the determination of the controller 20.

The detecting means 10 includes a front camera 11, a vehicle speed sensor 12, a steering angle sensor 13, a distance sensor 14, an acoustic sensor 15, and a GPS transceiver 16.

The front camera 11 is mounted on the front of the vehicle to photograph objects in front, and photographs the road reflector in front and at the same time photographs the appearance of the opponent vehicle in the opposite lane reflected through the mirror surface of the road reflector. The front camera 11 may simultaneously perform functions of a detecting means for detecting a road reflector and a detecting means for detecting an opponent vehicle.

The vehicle speed sensor 12 is provided in the vehicle and detects the speed of the own vehicle being driven in real time.

The steering angle sensor 13 is provided in the vehicle and detects a rotational angle (steering angle) of a steering wheel in real time.

The distance sensor 14 is provided in the vehicle and detects the distance between the own vehicle being driven and the road reflector in real time.

The acoustic sensor 15 is provided in the vehicle and detects an external sound, in particular, an exit cautionary alarm that rings when entering and exiting a parking lot.

The GPS transceiver 16 is provided in the vehicle and receives the current location of the vehicle through transmission/reception with GPS satellites.

The controller 20 includes a road reflector determinator 21, an opponent vehicle determinator 22, an own vehicle speed determinator 23, a road curvature determinator 24, an own vehicle-road reflector distance determinator 25, an exit alarm determinator 26, an own vehicle location determinator 27, and a warning generation determinator 28.

The road reflector determinator 21 may analyze an image taken and transmitted by the front camera 11 in real time to determine whether am object in front is a road reflector suitable for installation standards. Installation standards for road reflectors such as size, shape, and height are determined by the relevant laws and regulations, and the relevant installation standards of the road reflector are input in advance in the road reflector determinator 21. In the road reflector determinator 21, by comparing the object information detected from the front with the installation standard of the road reflector set in advance, whether an object detected from the front is a road reflector that meets installation standards may be determined.

The opponent vehicle determinator 22 may analyze the image taken by the front camera 11 in real time to analyze whether the appearance of the opponent vehicle is reflected on the mirror surface of the road reflector and the reflected appearance of the opponent vehicle in real time. Through this analysis, it is possible to determine whether an opponent vehicle is driving in the opposite lane and whether the opponent vehicle is approaching or moving away from the road reflector side (i.e., the own vehicle side). Whether the opponent vehicle is approaching may be determined based on whether the appearance of the opponent vehicle reflected on the mirror surface of the road reflector is the front part or the rear part of the vehicle. Reference information about the front and rear parts of the vehicle is input in advance to the opponent vehicle determinator 22, and in the opponent vehicle determinator 22, by comparing the appearance of the opponent vehicle detected from the front with reference information, whether the appearance of the opponent vehicle is the front part or the rear part may be determined. If the appearance of the opponent vehicle is the front part, it may be determined that the opponent vehicle is approaching toward the road reflector, and if the appearance of the opponent vehicle is the rear part, it may be determined that the opponent vehicle is moving away from the road reflector.

The own vehicle speed determinator 23 may determine the speed of the own vehicle in real time through a signal transmitted from the vehicle speed sensor 12.

In the road curvature determinator 24, the curvature of the road in which the vehicle is driving may be determined in real time through a signal transmitted from the steering angle sensor 13.

The own vehicle-road reflector distance determinator 25 may determine the distance between the own vehicle and the road reflector in real time through a signal transmitted from the distance sensor 14.

The exit alarm determinator 26 may determine whether an external voice signal is an exit alarm heard when entering and exiting the parking lot through a signal transmitted through the acoustic sensor 15. Reference information on the exit alarm heard when entering and exiting the parking lot may be input in advance to the exit alarm determinator 26.

The own vehicle location determinator 27 may determine the location of the own vehicle through a signal transmitted through the GPS transceiver 16. In other words, it is possible to determine whether the own vehicle is in a mountainous curve section, a non-signalized intersection, or an indoor parking lot.

The warning generation determinator 28 determines whether to generate a warning through the information determined by the above-described determinators. In addition, the warning generation determinator 28 may set the risk of vehicle collision in stages and set the intensity and cycle of warning in stages.

The warning generating means 30 is provided in the vehicle and generates a warning signal so that the driver may drive with caution. The warning may be generated through video or audio or a combination thereof, but is not limited thereto and other means may be used. In addition, the warning generating means 30 may be configured to adjust the intensity and cycle of the generated warning.

As described above, according to the device for vehicle collision cautionary information using a road reflector according to the present disclosure, when driving in sections where road reflectors are installed, such as curved sections in mountainous areas, non-signalized intersections, and indoor parking lots, by issuing a warning to the driver when an opponent vehicle approaches from the opposite lane, the risk of collision with the opponent vehicle may be prevented in advance. At this time, in order to generate a warning, various factors such as whether a road reflector is present, whether an opponent vehicle is present, whether the opponent vehicle is approaching, the speed of the own vehicle, the road curvature, the distance between the own vehicle and the road reflector, exit alarm and the current location of the own vehicle may be considered.

All of these various factors may be considered or may be considered selectively. Various example embodiments will be reviewed with reference to FIGS. 2 to 6.

Figure 2:
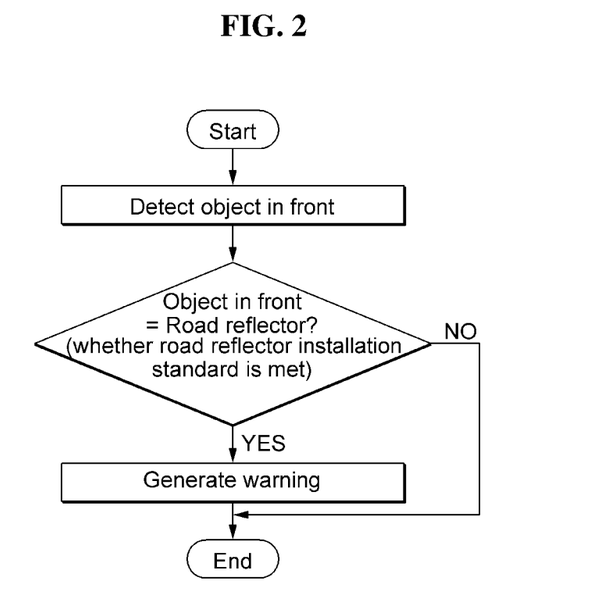
FIG. 2 is a flowchart illustrating a first example embodiment of a process of issuing a warning to a driver using a device for vehicle collision cautionary information using a road reflector according to a preferred example embodiment the present disclosure.

FIG. 2 is a flowchart illustrating a first example embodiment of a process of issuing a warning to a driver using a device for vehicle collision cautionary information using a road reflector according to a preferred example embodiment of the present disclosure.

In the present example embodiment, it is possible to warn the driver by determining only whether a road reflector is present in front. In other words, if a road reflector is present in front, it may be determined that the driving road is a curved section in a mountainous area, a non-signalized intersection, or a parking lot entrance access road, and since there is a risk of collision when an opponent vehicle driving in the opposite lane approaches, it is necessary to warn the driver to drive with caution.

While the vehicle is driving, the front camera 11 photographs objects in the front, and the image taken by the front camera 11 is transmitted to the road reflector determinator 21 in real time. In addition, the distance sensor 14 detects the distance between the own vehicle and the object in front in real time, and the detection signal is transmitted to the own vehicle-road reflector distance determinator 25.

In the road reflector determinator 21, by comparing image information transmitted from the front camera 11 with road reflector installation standard information input in advance, whether the front object is a road reflector installed to meet installation standards is determined. At this time, the road reflector determinator 21 may determine whether the front object is a road reflector while sharing distance information between the own vehicle and the object in front in real time in association with the own vehicle-road reflector distance determinator 25.

If it is determined that the object in front is not a road reflector, the control process ends since no warning is generated. If it is determined that the object in front is a road reflector, the warning generation determinator 28 determines that it is necessary to issue a warning to the driver, and generates a warning through the warning generating means 30.

Figure 3:
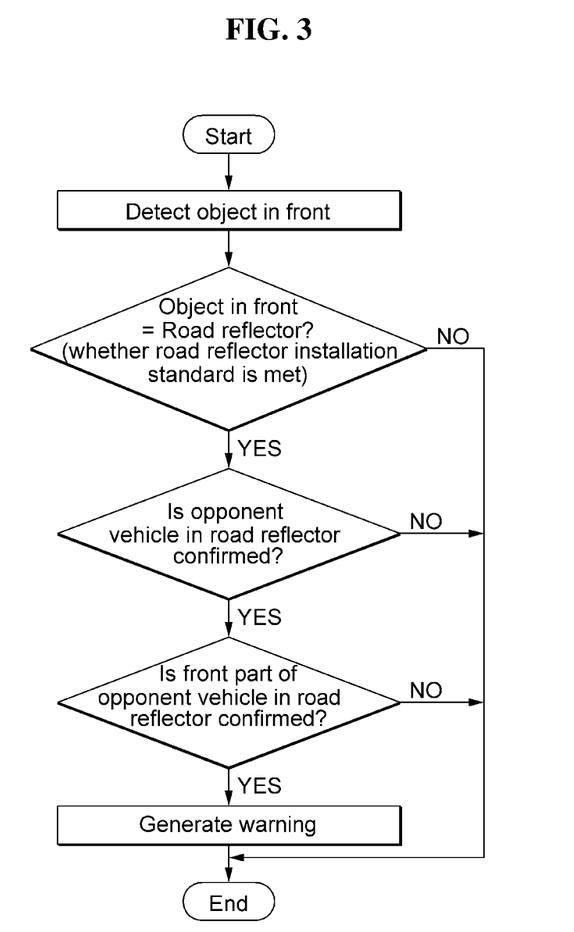
FIG. 3 is a flowchart illustrating a second example embodiment of a process of issuing a warning to a driver using a device for vehicle collision cautionary information using a road reflector according to a preferred example embodiment the present disclosure.

FIG. 3 is a flowchart illustrating a second example embodiment of a process of issuing a warning to a driver using a device for vehicle collision cautionary information using a road reflector according to a preferred example embodiment of the present disclosure.

In the present example embodiment, it is possible to issue a warning to the driver by checking whether a road reflector is present, whether an opponent vehicle on the opposite side is confirmed, and whether the opponent vehicle is approaching. Here, since whether a road reflector is present is the same as in the first example embodiment, the description will be omitted.

When the object in front photographed through the front camera 11 is determined to be a road reflector, whether an opponent vehicle is confirmed through the mirror surface of the road reflector is determined.

Whether the object reflected through the mirror surface is the opponent vehicle may be determined by comparing vehicle information previously input to the opponent vehicle determinator 22 with the detected object. If the opponent vehicle is not confirmed through the mirror surface of the road reflector, it is determined that the opponent vehicle is not present in the opposite lane, and accordingly, the warning generation is not required and the control process ends.

If the opponent vehicle is confirmed through the road reflector, it is additionally determined whether the opponent vehicle approaches or moves away from the road reflector side, i.e., the own vehicle side. This may be determined through whether the appearance of the opponent vehicle reflected on the mirror surface of the road reflector is the front part or the rear part. In other words, if the part reflected through the mirror surface is the front part of the vehicle, it may be determined that the vehicle is approaching, and if the part reflected is the rear part of the vehicle, it may be determined that the vehicle is moving away.

When it is determined that the opponent vehicle is approaching in the opponent vehicle determinator 22, the warning generation determinator 28 determines that it is necessary to issue a warning to the driver, and generates a warning through the warning generating means 30. If it is determined that the opponent vehicle is moving away, there is no need to generate a warning because it may be determined as a vehicle driving ahead in the same direction as the own vehicle.

Figure 4:
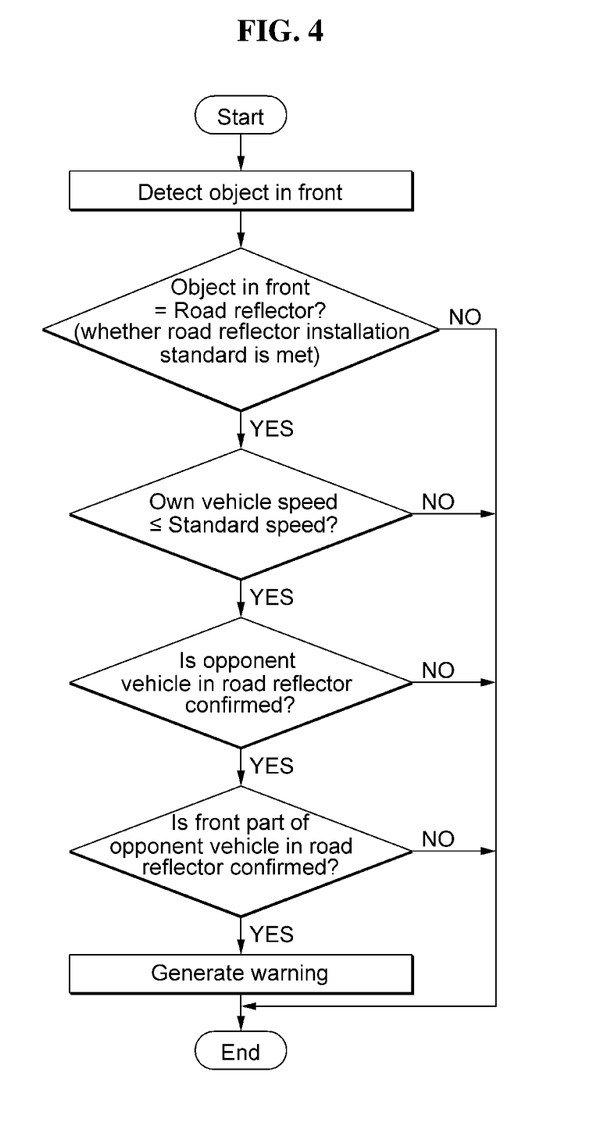
FIG. 4 is a flowchart illustrating a third example embodiment of a process of issuing a warning to a driver using a device for vehicle collision cautionary information using a road reflector according to a preferred example embodiment the present disclosure.

FIG. 4 is a flowchart illustrating a third example embodiment of a process of issuing a warning to a driver using a device for vehicle collision cautionary information using a road reflector according to a preferred example embodiment of the present disclosure.

In the present example embodiment, as a factor considered for generating a warning, a speed factor of the own vehicle may be further added in addition to whether a road reflector is present, whether an opponent vehicle on the opposite side is confirmed, and whether the opponent vehicle is approaching. Here, since whether a road reflector is present, whether an opponent vehicle on the opposite side is confirmed, and whether the opponent vehicle is approaching are the same as those in the second example embodiment, description thereof will be omitted.

Even if a road reflector is present in front and an opponent vehicle approaches from the opposite lane through the road reflector, it may be controlled to generate a warning only when the speed of the own vehicle is below the prescribed speed. This is because it may be difficult to secure the necessary distance through the road reflector when the speed of the own vehicle exceeds the prescribed speed. The prescribed speed may vary depending on the performance of the front camera 11 and the performance of the vehicle braking system.

Although not shown in FIG. 4, the intensity or frequency of warning generation may vary according to the speed of the own vehicle. For example, as the speed of the own vehicle increases, the risk of collision with the opponent vehicle increases relatively, and accordingly, by increasing the intensity of warning generation or the frequency of warning generation, the driver may be made to recognize the possibility of collision risk more seriously.

In addition, although not shown in FIG. 4, a distance factor between the own vehicle and the road reflector may be added. For example, as the distance between the own vehicle and the road reflector becomes closer, by increasing the intensity of warning generation or the frequency of warning generation, the driver may be made to recognize the possibility of collision risk more seriously.

Meanwhile, when considering the distance factor between the own vehicle and the road reflector, if the distance between the own vehicle and the road reflector is within a prescribed distance, additional control may be performed so that no warning is generated. In other words, if the distance between the own vehicle and the road reflector is too close, since the front part of the own vehicle may be reflected in the road reflector, it may be classified as a non-warning condition.

Figure 5:
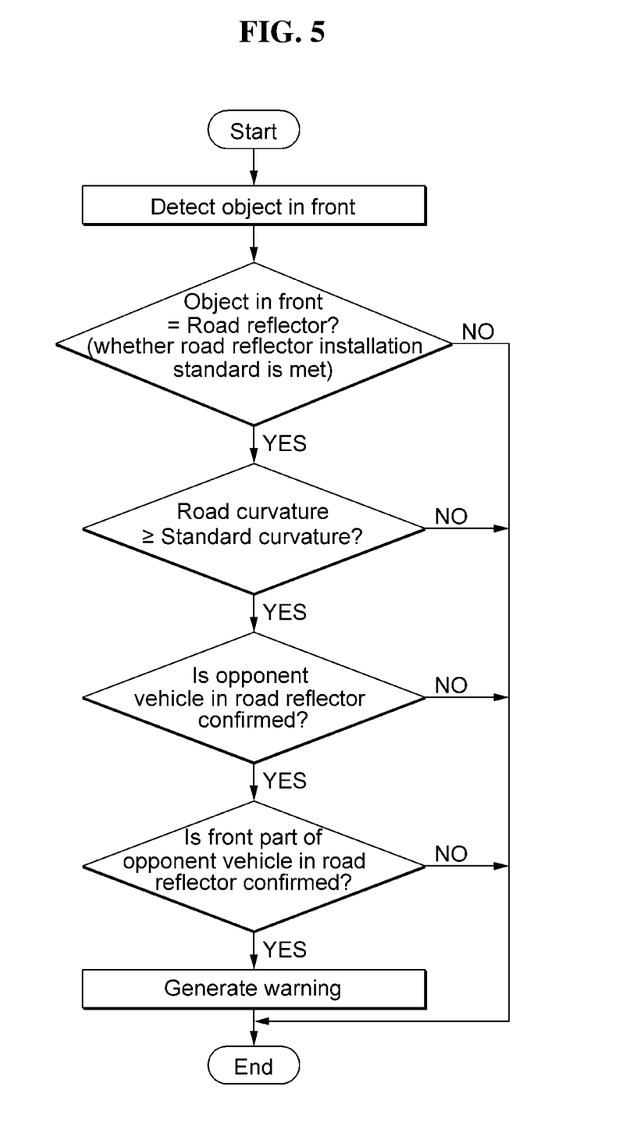
FIG. 5 is a flowchart illustrating a fourth example embodiment of a process of issuing a warning to a driver using a device for vehicle collision cautionary information using a road reflector according to a preferred example embodiment the present disclosure.

FIG. 5 is a flowchart illustrating a fourth example embodiment of a process of issuing a warning to a driver using a device for vehicle collision cautionary information using a road reflector according to a preferred example embodiment of the present disclosure.

In the present example embodiment, as a factor for generating a warning, a curvature factor of the road may be further added in addition to whether a road reflector is present, whether an opponent vehicle on the opposite side is confirmed, and whether the opponent vehicle is approaching. Here, since whether a road reflector is present, whether an opponent vehicle on the opposite side is confirmed, and whether the opponent vehicle is approaching are the same as those in the second example embodiment and the third example embodiment, description thereof will be omitted.

In other words, even if a road reflector is present in front and an opponent vehicle approaches from the opposite lane through the road reflector, it may be controlled to generate a warning only when the curvature of the road is greater than or equal to a reference value. If the curvature of the road is small, the road should be regarded as gently curved, so it may be determined that the own vehicle is located far from the road reflector. If the curvature of the road is large, the road should be regarded as being sharply curved, so it may be determined that the own vehicle is located close to the road reflector.

Although not shown in FIG. 5, warning generation may be controlled by considering both the speed factor of the own vehicle and the distance factor between the own vehicle and the road reflector in addition to the curvature factor of the road.

Figure 6:
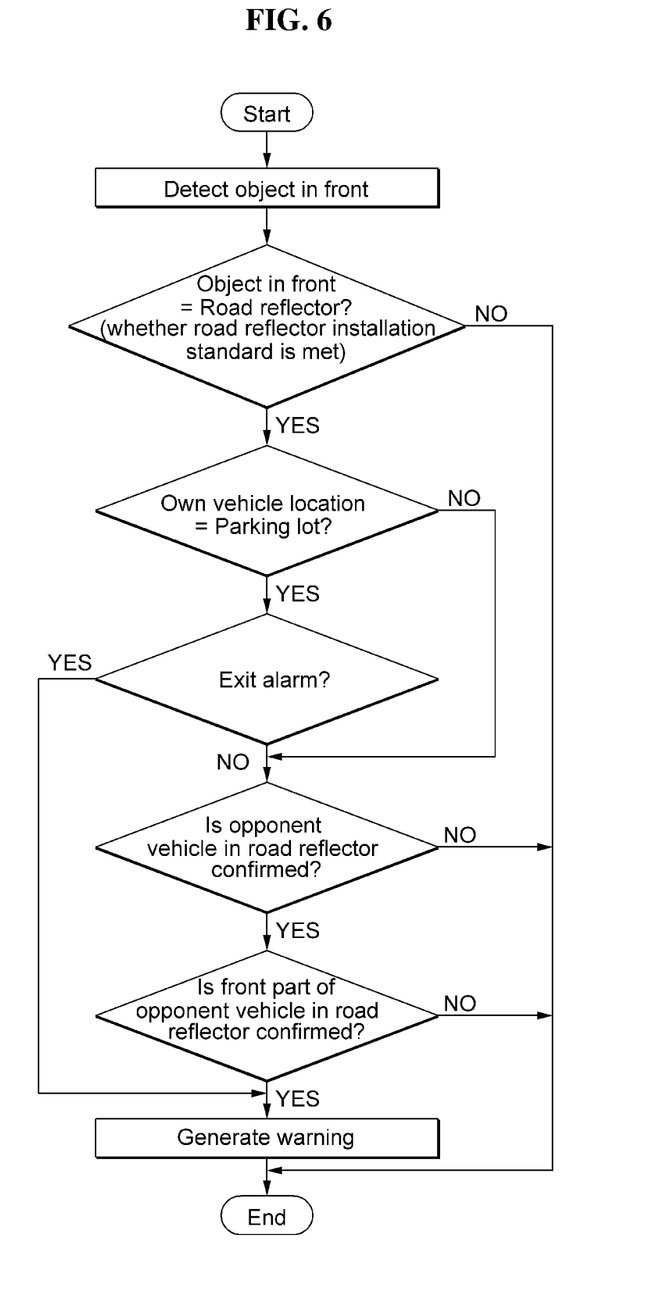
FIG. 6 is a flowchart illustrating a fifth example embodiment of a process of issuing a warning to a driver using a device for vehicle collision cautionary information using a road reflector according to a preferred example embodiment the present disclosure.

In the present example embodiment, in addition to whether a road reflector is present, whether an opponent vehicle on the opposite side is confirmed, and whether the opponent vehicle is approaching, a location factor of the own vehicle and an exit alarm factor may be added.

If it is determined that a road reflector is present, the location of the own vehicle may be determined through GPS. The location of the own vehicle maybe largely classified into three categories. It may be classified into a curved section in a mountainous area, a parking lot equipped with a curved access road, and a non-signalized intersection.

If it is determined that the own vehicle is located in a curved section in a mountainous area or non-signalized intersection, whether an opponent vehicle driving through the opposite lane is present is determined through the mirror surface of the road reflector, and after determining whether the opponent vehicle is present, whether the opponent vehicle is approaching is determined. If it is determined that the opponent vehicle is approaching, the warning generation means 30 issues a warning to the driver.

If it is determined that the own vehicle is located at the access road of the underground or ground parking lot, whether an exit alarm rings may be first determined before determining whether an opponent vehicle is present and whether the opponent vehicle is approaching. In other words, when the exit alarm rings, it may be determined that a vehicle is approaching from the opposite lane, and thus, a warning may be generated without an additional determination process.

If the own vehicle is located on the access road of the parking lot but the exit alarm is not detected, it is checked whether the opponent vehicle is reflected through the road reflector, it is determined whether the opponent vehicle is approaching, and then the warning is generated. Since this process is the same as in the second to fourth example embodiments, the description will be omitted.

However, the vehicle reflected through the road reflector at the access road of the parking lot may include vehicles parked in the parking lot as well as vehicles driving through the opposite lane.

While the device and method for vehicle collision cautionary information using a road reflector according to preferable example embodiments of the present disclosure have been described in detail with reference to the accompanying drawings, the present disclosure is not limited to the above-described example embodiments, and may be variously modified and implemented within the scope of the claims.

[Explanation of Reference Numerals]

| | |
|---|---|
| 10: Detecting means | 11: Front camera |
| 12: Vehicle speed sensor | 13: Steering angle sensor |
| 14: Distance sensor | 15: Acoustic sensor |
| 16: GPS transceiver | 20: Controller |
| 21: Road reflector determinator | 22: Opponent vehicle determinator |
| 23: Own vehicle speed determinator | 24: Road curvature determinator |
| 25: Own vehicle-road reflector distance determinator | 26: Exit alarm determinator |
| 27: Own vehicle location determinator | 28: Warning generation determinator |
| 30: Warning generating means | |

FIG. 6 is a flowchart illustrating a fifth example embodiment of a process of issuing a warning to a driver using a device for vehicle collision cautionary information using a road reflector according to a preferred example embodiment of the present disclosure.

What is claimed is:

1. A device for vehicle collision cautionary information using a road reflector, the device comprising:
   a road reflector detecting means provided in a vehicle to detect the road reflector;

a controller provided in the vehicle to determine whether to generate a warning when the road reflector is detected by the road reflector detecting means; and a warning generating means provided in the vehicle to generate the warning according to the determination of the controller, wherein the controller is configured to further determine whether a reflected appearance of an opponent vehicle through the road reflector is a front part or a rear part as a warning generating requirement.

2. The device of claim 1, wherein the controller is configured to determine whether to generate the warning by determining whether object information transmitted from the road reflector detecting means satisfies a road reflector installation standard.

3. The device of claim 1, further comprising:

an opponent vehicle detecting means provided in the vehicle to detect the reflected appearance when the opponent vehicle in an opposite lane is reflected through the road reflector and transmit detection information to the controller, wherein the controller is configured to determine whether to generate the warning after determining both road reflector detection requirements and opponent vehicle detection requirements through the road reflector.

4. The device of claim 3, wherein the road reflector detecting means and the opponent vehicle detecting means are front cameras installed in the front of the vehicle.

5. The device of claim 1, wherein the road reflector detecting means is a front camera installed in the front of the vehicle.

6. The device of claim 1, further comprising:

a vehicle speed detecting means provided in the vehicle to detect a speed of the own vehicle, wherein the controller is configured to further determine the speed of the own vehicle detected by the vehicle speed detecting means as a warning generating requirement.

7. The device of claim 1, further comprising:

a steering angle detecting means provided in the vehicle to detect a steering angle of the own vehicle, wherein the controller is configured to calculate a curvature of a road through the steering angle of the own vehicle detected by the steering angle detecting means and further determine the curvature of the road as a warning generating requirement.

8. The device of claim 1, further comprising:

a distance detecting means provided in the vehicle to detect a distance between the own vehicle and the road reflector, wherein the controller is configured to further determine the distance between the own vehicle and the road reflector detected by the distance detecting means as a warning generating requirement.

9. The device of claim 1, further comprising:

an own vehicle location checking means provided in the vehicle to check a driving location of the own vehicle, wherein the controller is configured to further determine the driving location of the own vehicle checked through the own vehicle location checking means as a warning generating requirement.

10. The device of claim 9, wherein the own vehicle location checking means is a GPS transceiver provided in the vehicle to perform transmission and reception with GPS satellites.

11. A device for vehicle collision cautionary information using a road reflector, the device comprising:

a road reflector detecting means provided in a vehicle to detect the road reflector;

a controller provided in the vehicle to determine whether to generate a warning when the road reflector is detected by the road reflector detecting means;

a warning generating means provided in the vehicle to generate the warning according to the determination of the controller; and an exit alarm detecting means provided in the vehicle to detect an exit cautionary alarm of a parking lot;

wherein the controller is configured to further determine an exit alarm confirmed through the exit alarm detecting means as a warning generating requirement, wherein the controller is configured to further determine the reflected appearance of the opponent vehicle through the road reflector is a front part or a rear part as a warning generating requirement.

12. A method for vehicle collision cautionary information using a road reflector, the method comprising:

detecting a road reflector by an own vehicle;

determining whether to generate a warning by a controller when the road reflector is detected; and generating the warning to the own vehicle according to the determination of the controller, wherein the determining whether to generate the warning comprises determining whether to generate the warning by further determining whether the reflected appearance of the opponent vehicle through the road reflector is a front part or a rear part.

13. The method of claim 12, wherein the determining whether to generate the warning comprises determining whether to generate the warning by comparing an installation standard of the road reflector previously input to the controller with installation information of a detected object and determining whether the detected object satisfies the installation standard of the road reflector.

14. The method of claim 12, further comprising:

detecting a reflected appearance when an opponent vehicle in an opposite lane is reflected through the road reflector and transmitting detection information to the controller, wherein the determining whether to generate the warning comprises determining whether to generate the warning by considering both whether the road reflector is detected and whether the appearance of the opponent vehicle is confirmed through the road reflector.

15. The method of claim 12, further comprising:

detecting a speed of the own vehicle, wherein the determining whether to generate the warning comprises determining whether to generate the warning by further determining whether the speed of the own vehicle meets a standard speed.

16. The method of claim 12, further comprising:

detecting a steering angle of the own vehicle, wherein the determining whether to generate the warning comprises determining whether to generate the warning by determining a curvature of a road being driven through the steering angle of the own vehicle and further determining whether the road curvature meets a standard.

17. The method of claim 12, further comprising:

detecting a distance between the own vehicle and the road reflector, wherein the determining whether to generate the warning comprises determining whether to generate the warning by further determining whether the distance between the own vehicle and the road reflector meets a standard.

18. The method of claim 12, further comprising:
checking a location of the own vehicle,
wherein the determining whether to generate the warning comprises determining whether to generate the warning by further determining the location of the own vehicle.

19. The method of claim 18, further comprising:
detecting an exit alarm when entering and exiting a parking lot,
wherein the determining whether to generate the warning comprises determining whether to generate the warning by further determining whether the exit alarm is detected.

\* \* \* \* \*